US009028357B2

(12) United States Patent
Peura et al.

(10) Patent No.: US 9,028,357 B2
(45) Date of Patent: May 12, 2015

(54) POWER TRANSFER UNIT SHAFT INPUT

(75) Inventors: Brent Michael Peura, Farmington, MI (US); Robert Genway-Haden, Rochester, MI (US); Theodor Gassmann, Lohmar (DE); Mark Schmidt, Lohmar (DE); Michael Schwekutsch, Lohmar (DE)

(73) Assignee: GKN Driveline North America, Inc., Auburn Hills, MI (US)

( * ) Notice: Subject to any disclaimer, the term of this patent is extended or adjusted under 35 U.S.C. 154(b) by 396 days.

(21) Appl. No.: 13/513,459

(22) PCT Filed: Dec. 2, 2010

(86) PCT No.: PCT/US2010/058696
§ 371 (c)(1),
(2), (4) Date: Jun. 1, 2012

(87) PCT Pub. No.: WO2011/068949
PCT Pub. Date: Jun. 9, 2011

(65) Prior Publication Data
US 2012/0238395 A1    Sep. 20, 2012

Related U.S. Application Data

(60) Provisional application No. 61/265,959, filed on Dec. 2, 2009, provisional application No. 61/297,498, filed on Jan. 22, 2010.

(51) Int. Cl.
*F16H 48/06* (2006.01)
*B60K 23/08* (2006.01)
(Continued)

(52) U.S. Cl.
CPC .............. *B60K 23/08* (2013.01); *F16H 48/08* (2013.01); *F16H 48/10* (2013.01); *B60K 17/344* (2013.01)

(58) Field of Classification Search
CPC .................................. F16H 48/08; F16H 48/10
USPC .................................................. 475/200, 221
See application file for complete search history.

(56) References Cited

U.S. PATENT DOCUMENTS 4,476,952 A * 10/1984 Suzuki .......................... 180/247
4,669,332 A    6/1987 Katayama
(Continued)

FOREIGN PATENT DOCUMENTS

DE    3911118 A1    11/1989
DE    4434512 A1    2/1996
(Continued)

OTHER PUBLICATIONS

EP Extended Search Report dated Dec. 20, 2013, (13 pages).
(Continued)

*Primary Examiner* — Derek D Knight
(74) *Attorney, Agent, or Firm* — Jennifer M. Brumbaugh; Reising Ethington P.C.

(57) ABSTRACT

A power transfer unit assembly for a vehicle. The power transfer unit includes a housing, an internal variable speed differential positioned within the housing, a first front side shaft rotatively connected to the differential, a second front side shaft rotatively connected to the differential, an input shaft interconnected to at least one of the first and second side shafts, and at least one shifting mechanism for engaging at least one of the first and second shafts with at least one mode selection gear set. Engagement of the mode selection gear set transfers torque through the input shaft to selectively engage with a second gear set interconnected to a power transfer final drive unit assembly having an internal variable speed differential.

19 Claims, 14 Drawing Sheets

(51) Int. Cl.
*F16H 48/08* (2006.01)
*F16H 48/10* (2012.01)
*B60K 17/344* (2006.01)

(56) References Cited

U.S. PATENT DOCUMENTS

| | | | |
|---|---|---|---|
| 4,678,055 | A | 7/1987 | Yoshinaka et al. |
| 5,083,478 | A | 1/1992 | Hiraiwa |
| 5,836,848 | A | 11/1998 | Janiszewski et al. |
| 2006/0094556 | A1 | 5/2006 | Mizon et al. |
| 2006/0281597 | A1 | 12/2006 | Williams et al. |
| 2008/0227582 | A1 | 9/2008 | Peura |
| 2008/0300101 | A1* | 12/2008 | Jarzyna et al. ............ 475/206 |
| 2011/0105265 | A1 | 5/2011 | Yoshimura |

FOREIGN PATENT DOCUMENTS

| | | |
|---|---|---|
| JP | 58-089425 | 5/1983 |
| JP | S58-164433 | 9/1983 |
| JP | 2002-370557 | 12/2002 |
| JP | 2009-126457 | 6/2009 |

OTHER PUBLICATIONS

JP Office Action dated Mar. 11, 2014 (2 pages).

\* cited by examiner

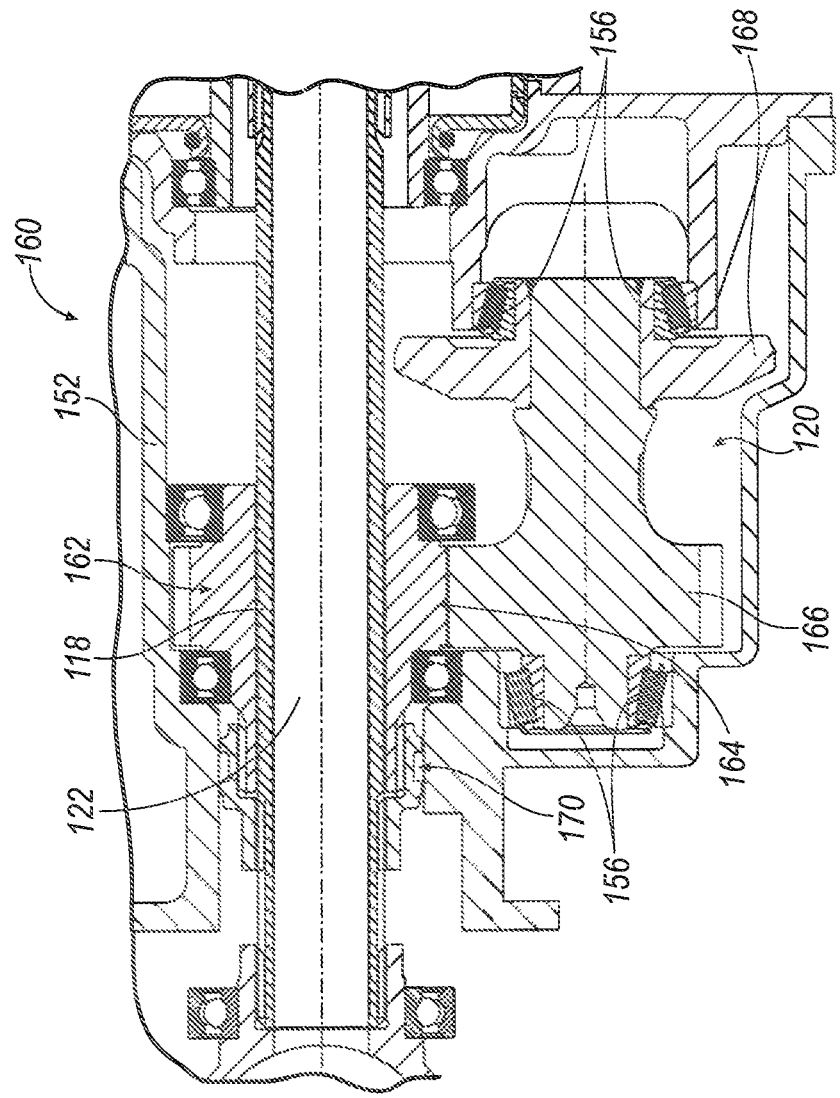

POWER TRANSFER UNIT SHAFT INPUT

CROSS-REFERENCE TO RELATED APPLICATIONS

This application claims priority to U.S. Provisional Application Nos. 61/265,959, filed on Dec. 2, 2009, and 61/297,498, filed on Jan. 22, 2010, all of which are hereby incorporated herein by reference in their entirety.

TECHNICAL FIELD

The disclosure generally relates to power transfer units and more particularly, to power transfer units with integrated differential and shaft inputs for shifting between two-wheel-drive to all-wheel or four-wheel drive modes.

BACKGROUND OF THE INVENTION

Fuel and driveline efficiency is a controlling factor in the design of vehicle components. Specifically, designers of all-wheel drive and four-wheel drive vehicles weigh fuel efficiency for daily driving against performance in extreme roadway or off-highway conditions. Motor vehicles are driven by a transmission that transmits rotational torque to a power transfer unit (also known as a power take-off unit) through a torque transmitting shaft. The power transfer unit ultimately drives a plurality of axles that can be divided into those with a hang-on four-wheel drive, wherein a primary axle is driven permanently and a secondary axle is connected if required, and those with a permanent four-wheel drive, wherein both axles are driven permanently. The design of the driveline is largely influenced by the arrangement of the engine in the motor vehicle, i.e. whether it is arranged in the front or at the rear and whether it is positioned in the longitudinal or transverse direction. At the same time, stringent packaging requirements exist regarding size, weight, and assembly costs of such systems.

Power transfer units are commonly utilized in front-wheel drive based all-wheel drive systems. A power transfer unit transmits the torque from the transmission to a propshaft, which in turn delivers power to the rear wheels. Most power transfer units are always in a ready state, commonly controlled by a slipping clutch near the rear axle, and yet are utilized only a small fraction of the time during driving. However, in this "ready state", the existing power transfer units exhibit a full time drain to fuel efficiency with only a part-time benefit In typical four-wheel drive based layouts, the engine is longitudinally mounted, and the power transfer unit locks to simultaneously drive both a front and rear shaft, which in turn activate the rotation of front and rear external differentials to drive a shaft extending to each wheel. The typical external differential is a single 90° gear set that drives the wheels. Alternatively, in a typical front-wheel drive based all-wheel drive hang on layout, the engine is transversely mounted, and the front differential is included within or as a direct part of the transmission assembly. The vehicle can be driven in an all-wheel drive configuration by transferring power from the power transfer unit and delivering it to the rear wheels through a single gear set in a differential unit while driving the front wheels. This can be accomplished by several known couplings, including on-demand couplings.

In vehicles where it is desirable to provide a very low range (creep) drive mode, however, the vehicle transmission may not provide a low enough drive ratio to enable a very low range drive ratio. This may be particularly true in cases of conventional transmission designs where the differential is located internally to the transmission with no other gear reduction mechanism provided.

Thus, there exists a need for efficiently transitioning between a two-wheel drive system to a four-wheel drive or all-wheel drive system by transferring rotational torque and reducing the drive speed of the power transfer unit to enable a low range drive ratio, when engaging all four wheels, while maintaining a tight component package footprint.

BRIEF SUMMARY OF THE INVENTION

The present disclosure provides at least one power transfer unit having an integrated mode selection assembly and an integrated range selection differential assembly in a vehicle driveline. The power transfer unit is modular such that internal components may be interchanged between a front power transfer unit assembly and a power transfer final drive unit assembly. In one arrangement, the integrated power transfer unit may be rotatively connected at one end to a transmission and to the final power transfer drive unit assembly through a propeller shaft connected at a front power transfer unit assembly output end. A front power transfer unit assembly case houses a range selection assembly and a mode selection assembly. The assemblies are selectively engaged using one of a sliding input shaft, a mode engagement element, a range engagement element and a combination of the engagement elements.

The front power transfer unit may provide a two-stage, two-speed mode selection gear assembly for connecting and disconnecting the final drive unit assembly. The front power transfer unit assembly also includes a differential, which enables a very low final drive ratio and a mode selection assembly for selecting at least one of neutral, front-wheel drive, rear-wheel drive, all-wheel drive and four-wheel drive. For example, the power transfer unit and differential may provide multiple gear drive ratios ranging from approximately 1:1 to approximately 4:3. It should be known that the drive may be either an under or over drive, depending on the desired application. However, the gear ratios are not limited to any specific ratio, as the ratios listed are merely illustrative of possible ratios. The ratios are purely dependent upon the size of the gears selected for a specific application. Additionally, size and type of reduction gear depends on the desired application and may include, but is not limited to helical and planetary gear reduction gear sets. Therefore, a power transfer unit with integrated mode selection assembly and variable speed differential assembly for a vehicle is provided for transmitting a torque to a rear power transfer final drive unit when traction condition is requested.

Additionally, the selectively engaged power transfer final drive unit may include a single-stage mode selection assembly and a range selection assembly. Specifically, the mode selection assembly may include a single hypoid gear assembly selectively interconnected to an input shaft and a hollow shaft. The hollow shaft may be used to selectively transmit torque to the mode selection assembly at a first end and to the range selection assembly at a second end. The hollow shaft may be splined at each end for transmitting torque to the first rear output shaft and the second rear output shaft.

The power transfer final drive unit may provide torque to the front power transfer unit during synchronization prior to activating a mode shift. When the vehicle drive train is in operation and the wheels are spinning a request may be made by a computer module to engage the system, which results in engaging the electronic motor to activate and engage the final drive unit's mode selection and range selection assemblies.

The computer module may have a predetermined algorithm based on certain operating conditions, which allows a synchronized activation. Activation of the assemblies provides a reverse engagement causing the hypoid gear assembly to rotate at a reduced rate as compared to the wheel speed. This reduced rate is a result of an RPM delta across the friction plates. The reduced rate of rotation in the hypoid gear assembly helps to synchronize the activation of the mode selection in the front power transfer unit. Thus, the final drive unit transfers torque to the front power transfer unit during synchronization, and then the front power transfer unit transfers torque to the final drive unit during a traction request event.

The exemplary arrangement provides that the internal mode selection and range selection provide design flexibility in terms of packaging constraints. In addition, by activating the mode prior to the differential, the amount of stress placed on the system is minimized while improving efficiency. Furthermore, it is contemplated that the torque flow from the power transfer unit to the power transfer final drive unit and the torque flow from the final drive unit to the power transfer unit are unique.

BRIEF DESCRIPTION OF DRAWINGS

Referring now to the drawings, illustrative embodiments are shown in detail.

Although the drawings represent some embodiments, the drawings are not necessarily to scale and certain features may be exaggerated, removed, or partially sectioned to better illustrate and explain the exemplary embodiments. Further, the embodiments set forth herein are exemplary and are not intended to be exhaustive or otherwise limit or restrict the claims to the precise forms and configurations shown in the drawings and disclosed in the following detailed description.

FIG. 5A is an enlarged cross-sectional view illustrating a mode selection assembly of the power transfer unit illustrated in FIG. 4;

DETAILED DESCRIPTION

In the following description, various operating parameters and components are described for one exemplary constructed embodiment. These specific parameters and components are included as examples, but are not meant to be limiting.

Figure 1:
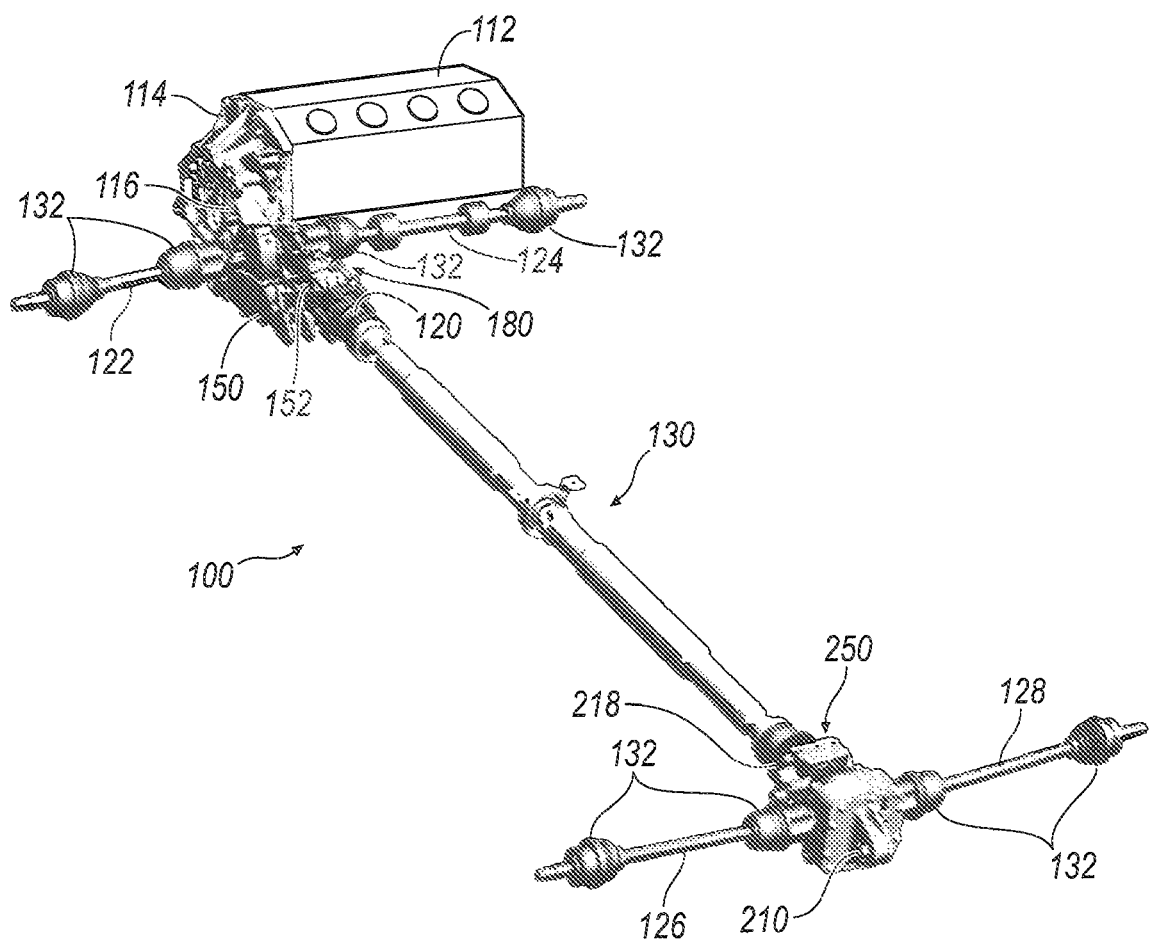
FIG. 1 is an isometric view of a vehicle drive train having an exemplary front power transfer unit and an exemplary power transfer final drive unit according to one exemplary arrangement.

Referring now to FIG. 1, an exemplary vehicle drive train assembly 100 is illustrated. The vehicle drive train assembly 100 is illustrated having a transversely mounted engine 112 and transmission 114. The vehicle drive train assembly 100 may include a plurality of shaft elements 122, 124, 126, 128 and corresponding articulating torque transfer joints, which are illustrated as a constant velocity joints 132. The shaft elements 122, 124, 126, 128 and joints 132 may be used to transmit torque from a power transfer unit 150 to a plurality of wheels (not shown). The wheels are generally positioned at an outer end of the shaft elements 122, 124, 126, 128, which provide power to drive the wheels. Generally, the engine 112 may be affixed to a transmission 114 through an engine crankshaft (not shown) that is fixed to a transmission input shaft (not shown) to provide torque to the transmission 114. The torque may be transmitted through a series of gears (not shown), within the transmission 114, and ultimately to a transmission output shaft 116 at an parallel offset from the transmission input shaft. At the transmission output which is offset from the engine output 112, the transmission 114 may be affixed to the power transfer unit 150, which has an input shaft 118 (best seen in FIG. 2), a first front shaft 122 may be positioned within the input shaft 118 to extend exteriorly (best seen in FIG. 1) from one end of the power transfer unit 150 and a second front shaft 124 extending from an opposite end of the power transfer unit 150.

Figure 2:
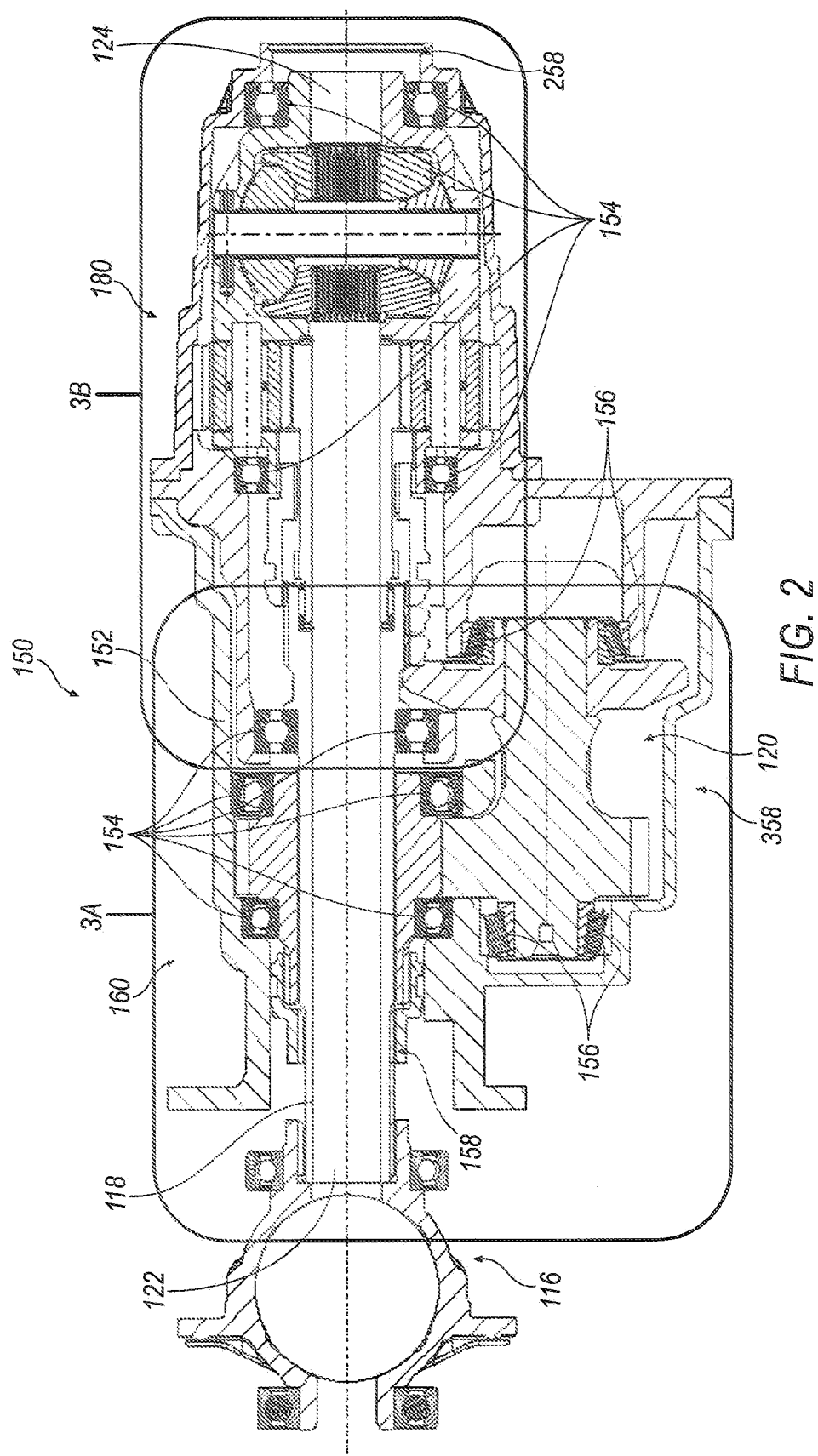
FIG. 2 is a cross-sectional view illustrating internal and external components of an exemplary power transfer unit having a fixed annulus gear.
Figure 3A:
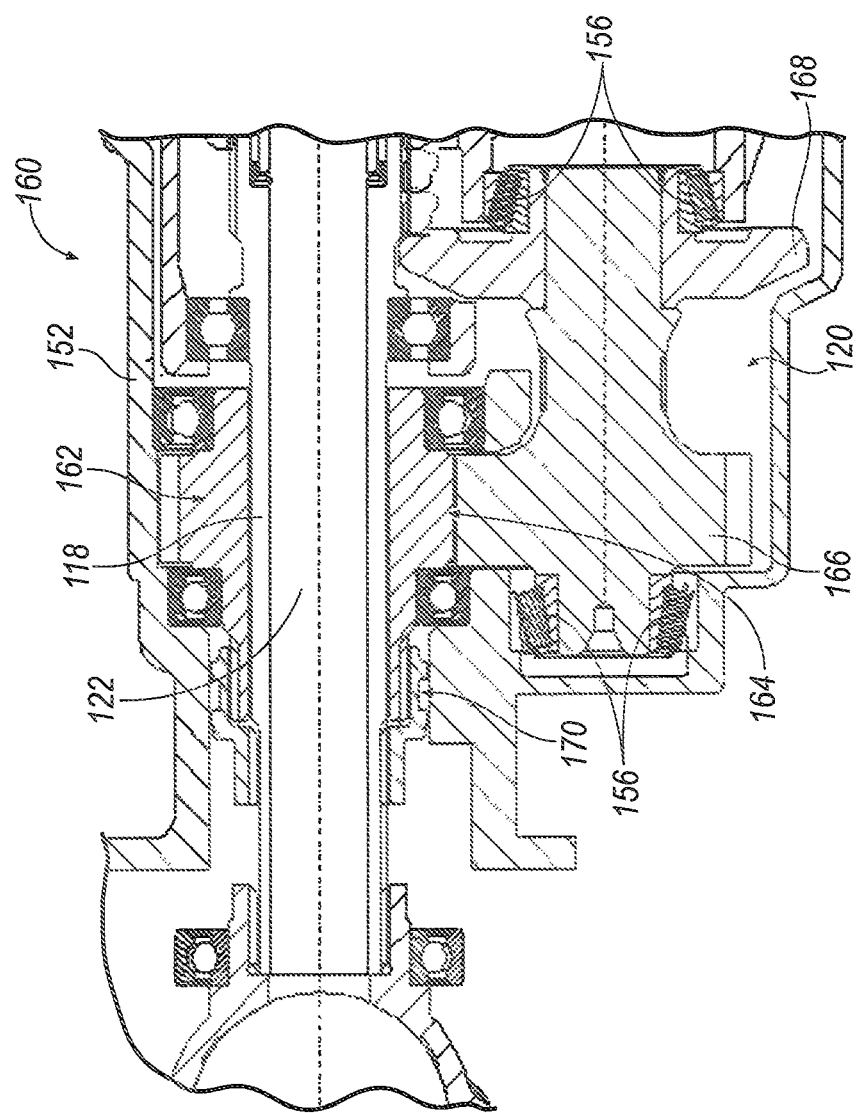
FIG. 3A is an enlarged cross-sectional view illustrating a mode selection assembly of the power transfer unit illustrated in FIG. 2.
Figure 3B:
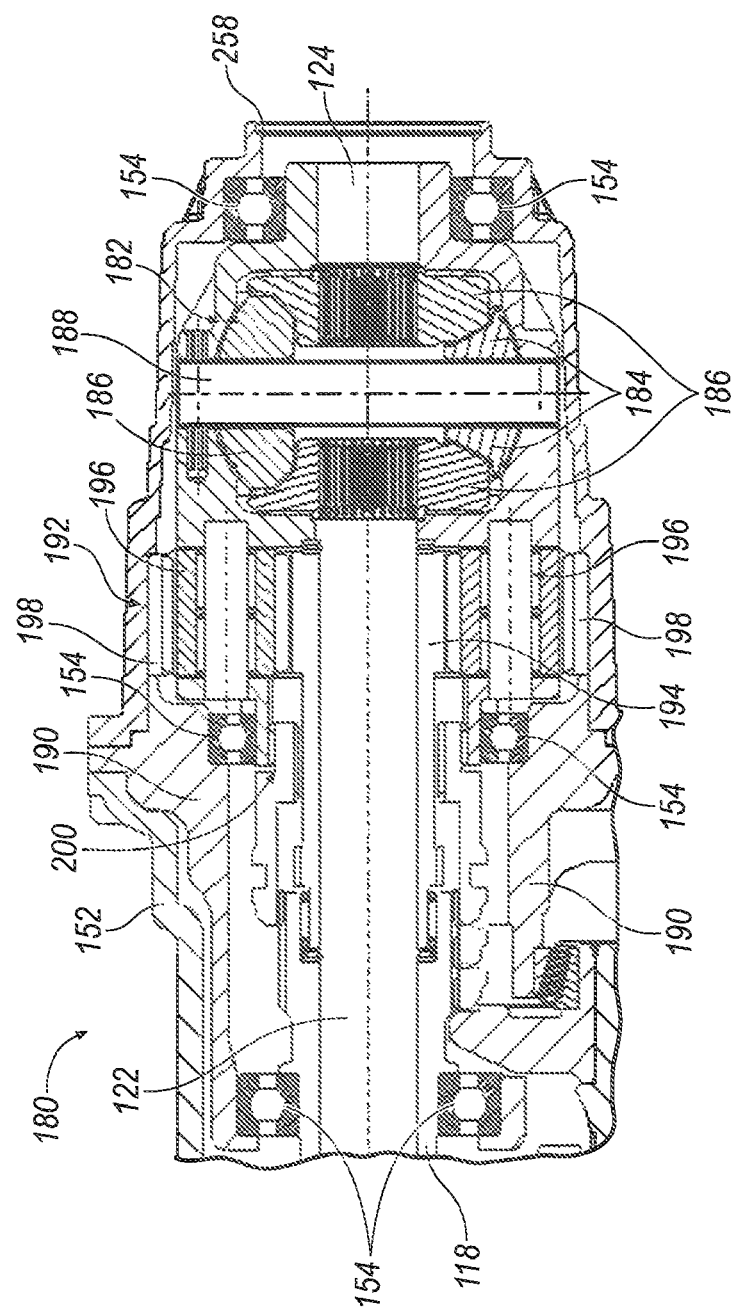
FIG. 3B is an enlarged cross-sectional view illustrating a range selection assembly of the power transfer unit illustrated in FIG. 2.

Referring to FIGS. 2, 3A, and 3B, the power transfer unit 150 may include an internal mode selection gear assembly 160 and an internal range selection gear assembly 180. (Referring to FIGS. 1, 11 and 12) The power transfer unit 150 may also include an output shaft 120 rotatively connected to the mode selection gear assembly 160 that is utilized to transfer power from the transmission output 116 through the mode selection assembly 160 to a propshaft 130. The propshaft 130 may be rotatively connected to a power transfer final drive unit 250, which may include an internal mode selection gear assembly 260 and an internal range selection gear assembly 280 to deliver power to the rear wheels (not shown). The power transfer final drive unit 250, mode selection assembly 260 and range selection assembly 280 with be discussed in greater detail below.

Turning to FIGS. 2-10, the power transfer unit 150 is illustrated in section highlighting internal components thereof, including the mode selection and range selection assemblies 160, 180. The exemplary power transfer unit 150 is comprised of a power transfer unit housing 152 that may enclose and support a series of rotating components, such as the shafts 118, 120, 122, 124, the mode selection gear assembly 160 and the range selection gear assembly 180. The rotating components, described in greater detail below, may be supported by a plurality of bearings 154, 156. The bearings 154, 156 may be of any known type, such as, but not limited to ball, needle, roller, thrust, angular ball, tapered roller, and thrust needle roller bearings. Specifically, bearings 154, 156 provide a rotating interface that supports an input shaft 118 interconnected to the internal mode selection gear assembly 160 and the range selection gear assembly 180.

Specifically turning to an exemplary mode selection gear assembly 160, as illustrated at least in FIGS. 2 and 3A, the mode selection gear assembly 160 may include a helical gear set 162 (as shown in typical 2 or 3 stage ptu layout) or a spiral/hypoid gearset which is typical in a single stage ptu (not shown) that is selectively engaged with the input shaft 118 through a selective engagement element 170. In one exemplary arrangement, the selective engagement element 170 may be moveable between a disengagement position (see at least FIG. 6), where the input shaft 118 is disengaged from the helical gear set 162 and the vehicle drive train is operating in a two-wheel drive mode, and an engagement position (see at least FIG. 3A), where the input shaft 118 is engaged to the helical gear set 162, which turns a hypoid gear set 166 such that the vehicle drive train is operating in an all-wheel or four-wheel drive mode. It should be known that selective engagement may be accomplished by a wide variety of suitable mechanisms and arrangements. Merely by way of example, engagement may be accomplished by directly sliding the engagement element 170 in an axial direction through the use of a manual or automatic shift fork (not shown). It is also contemplated that the input shaft 118 may be an axially sliding shaft that is manipulated automatically or manually to slide axially and engage or disengage the engagement element 170. Regardless of which embodiment is utilized, efficiency of the rotating assembly and ultimately fuel efficiency is increased when mode selection assembly 160 and associated engagement element 170 is in the disengaged position as the mode selection assembly 160 is not rotating.

Figure 4:
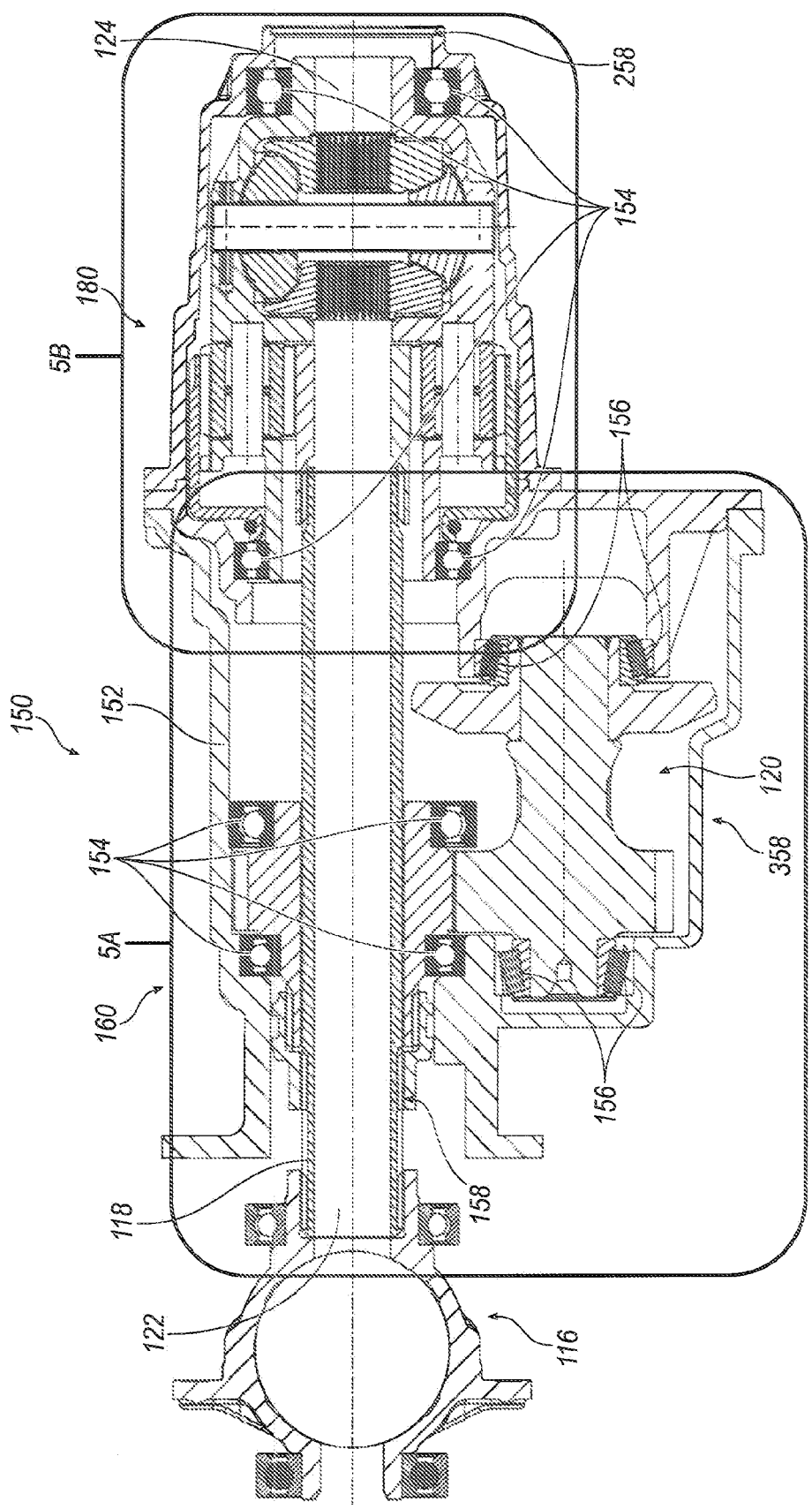
FIG. 4 is a cross-sectional view illustrating internal and external components of an exemplary power transfer unit having a selectable annulus gear.
Figure 5B:
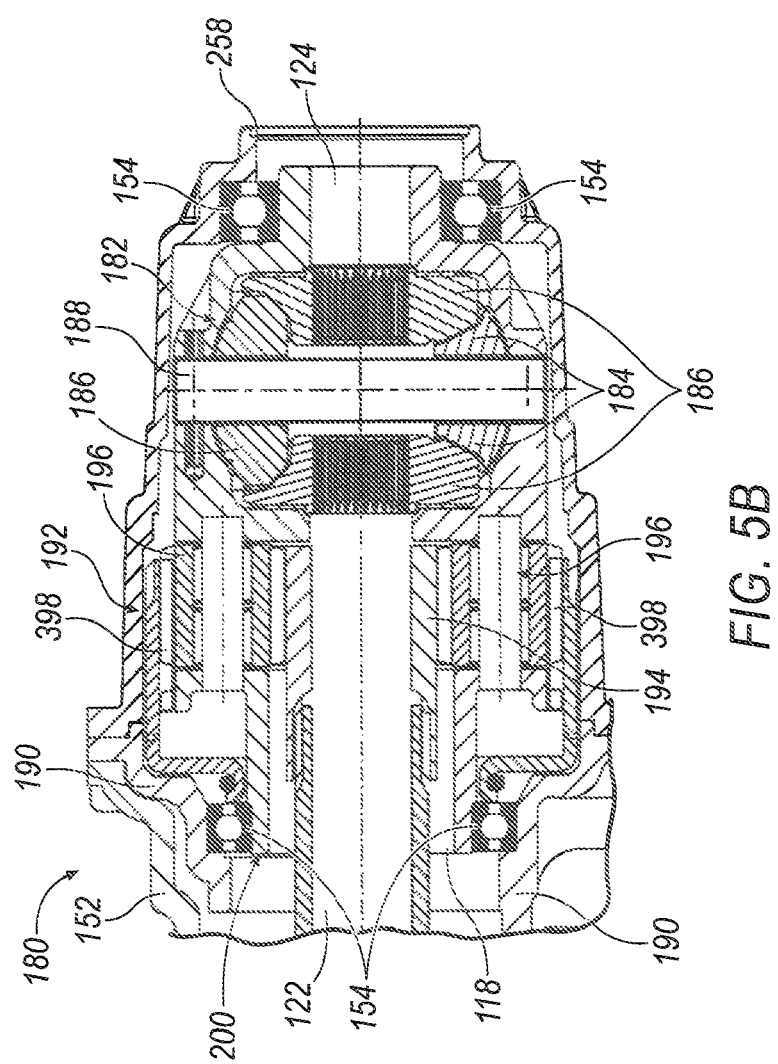
FIG. 5B is an enlarged cross-sectional view illustrating a range selection assembly of the power transfer unit illustrated in FIG. 4 in the engaged position to transfer torque to a rear output.
Figure 6:
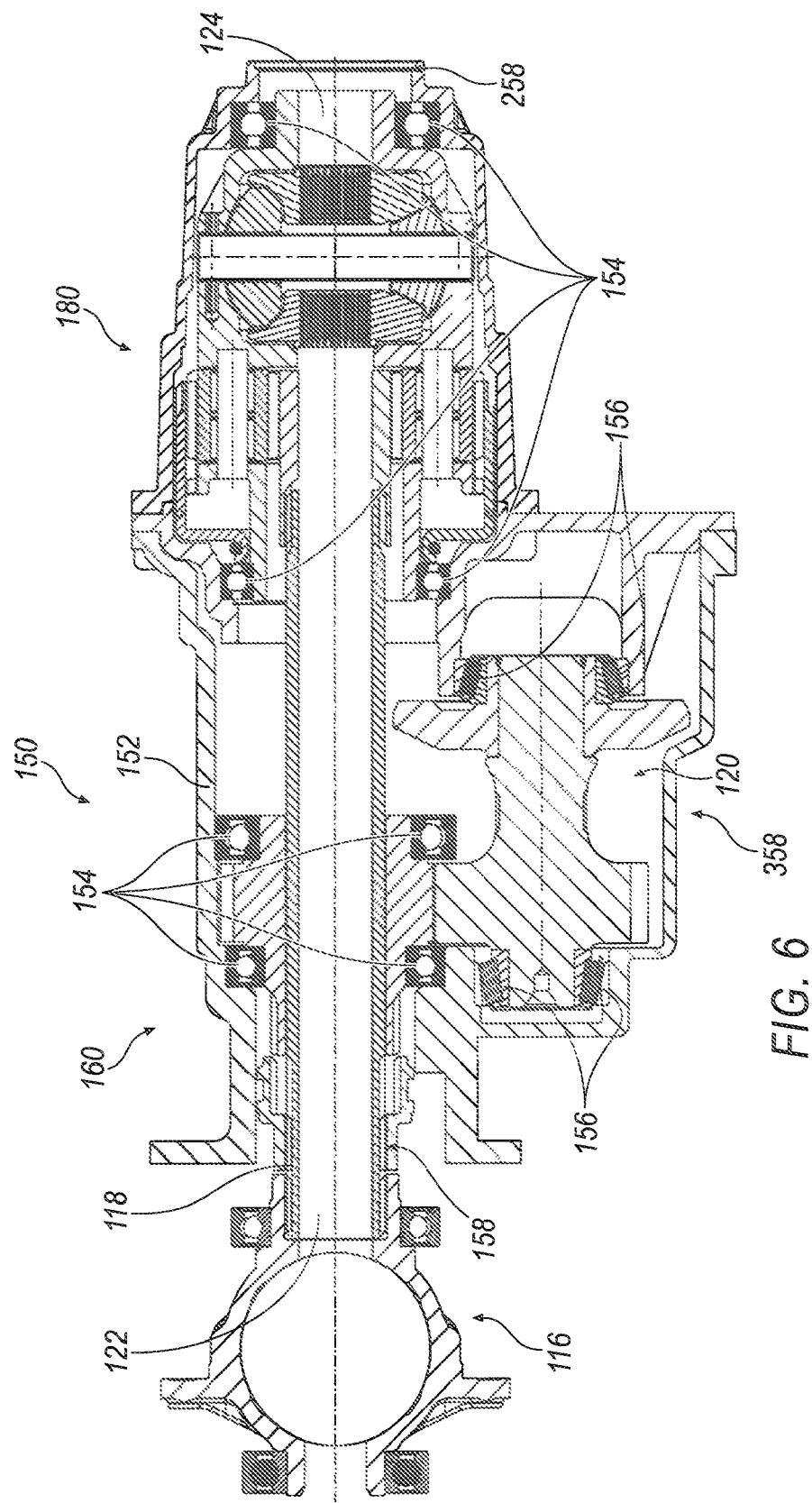
FIG. 6 is a cross sectional view illustrating the power transfer unit illustrated in FIG. 4, the power transfer unit is disengaged in a two-wheel drive first speed position (high range 1:1)

As illustrated in FIG. 3A, and FIG. 4 a four-wheel or all-wheel drive mode is selected as the engagement element 170 is engaged to connect and activate rotation, which transmits torque from the input shaft 118 to the helical gear set 162. The helical gear set 162 is rotatively connected to the helical 166 hypoid 168 assembly gear set at a gear mesh point 164. During operation in this mode, the transmission 114 rotates the input shaft 118, which is selectively engaged via the engagement element 170 to the helical gear set 162. The helical gear set 162 is then rotatively meshed with the hypoid gear set 166, which rotates the output shaft 120.

As discussed, operation of the helical gear set 166 in combination with the hypoid gear set 168 may directly convert a transverse rotational torque from the transmission 114 into a longitudinal torque. The longitudinal torque is transmitted down the propshaft 130 from the hypoid output shaft 120 (not shown) and into the power transfer final drive unit 250. The mode selection assembly 160 may be positioned between the transmission output shaft 116 and the range selection assembly 180 to provide rear torque transfer prior to range selection, which reduces the amount of stress going through the mode selection and range selection assemblies 180 when in higher than 1 to 1 ratio range selection. Specifically, by positioning the mode selection assembly 160 in this manner, an operator may allow for connecting and disconnecting of the torque flow prior to adding the additional stress of the high or low range, which is transferring torque to the rear and allowing a range reduction in the front and in the rear with the power transfer final drive unit 250. Providing two range reductions reduces the amount of stress going through a range reduction assembly 192 in the range selection assembly 180, as will be discussed in greater detail below. Thus, the full amount of torque is not transmitted front and back as would be if the torque was transmitted through the range reduction assembly 192 prior to transmission down the propshaft 130.

Turning to FIG. 3B, a detailed illustration of the range selection gear assembly 180 also known as speed selection assembly, is provided. The range selection gear assembly 180 may selectively engage the input shaft 118 to transfer torque at different speeds, from the transmission 114 to the first front side shaft 122 and the second front shaft 124. The first front side shaft 122 and the second front side shaft 124 meet in the power transfer unit housing 152. Within the housing 152 is contained a differential mechanism 182 engaging the side shafts 122, 124. In one embodiment, it is contemplated that the differential mechanism 182 is comprised of side gears 184 mounted to the side shafts 122, 124 and pinion gears 186 meshed thereto. The pinion gears 186 are held within the differential 182 by way of a pinion shaft 188.

Like the mode selection assembly 160, the range selection assembly 180 may selectively engage the input shaft 118 for transferring torque. The range selection assembly 180 may be selectively engaged between a first speed position 46 (see FIGS. 5B, 6 & 7) and a second speed position 48 (see FIG. 8). Although it is contemplated that the range selection assembly 180 may be controlled in a variety of fashions including, but not limited to, electronically or manually, in one embodiment it is contemplated that the range selection assembly 180 may be controlled via a shift fork (not shown) that is selectively engaged with an engagement collar 190 or, as discussed above, the slidable input shaft 118. Thus, the selective engagement may be achieved through the use of the shifting elements similar to those discussed above. The selective engagement results in either the engagement collar 190 or the input shaft 118 moving between the two speed positions, as well as an intermediate neutral position (illustrated in FIG. 9).

In the exemplary arrangement depicted, in the first speed position, the torque from the input shaft 118 is transferred directly to the differential 182 to result in a 1:1 drive ratio. However, by moving the range selection assembly 180 to the second speed position, the torque from the input shaft 118 is transferred through a speed reduction assembly 192. Although a variety of range selection assemblies 180 are contemplated in one exemplary embodiment, range reduction assembly 192 may be configured as a speed reduction assembly. In still another refinement, it is contemplated that the reduction gear assembly 192 may be comprised of a sun gear 194 positioned around and sharing an axis with the first side shaft 122 and a plurality of planetary gears 196 positioned around the sun gear 194 and engaging an annulus gear 198. It should be understood that the annulus gear 198 may either be fixed to the housing 152, as illustrated in FIGS. 2-3B, or selectively engaged to the housing 152, as illustrated in FIGS. 4-10. The selective engagement, as illustrated at least in FIGS. 4-10, includes a sliding annulus gear 398, which will be discussed in greater detail below. The use of a slidable annulus gear 398 may provide additional benefit by reducing the engagement of the rotating/meshing of components when not in use, which may provide greater rotating efficiency and fuel economy when in the 1:1 direct drive ratio. Additionally, regardless of which annulus gear 198, 398 is used, the mode selection assembly 160 is maintained and will function equally well.

By transferring the torque through the range reduction assembly 192, an approximate 4.3:1 drive ratio may be achieved. It should be understood that the precise drive ratio may be selectively modified through gearing to achieve a wide range of drive ratios. This arrangement allows the vehicle drive train 100 to have a "low" drive feature for off-road creeping and a "high" drive feature for roadways and improved gas mileage. This ratio/range step can also be used as an overdrive (versus low/underdrive) for fuel efficiency to decrease the engine/transmission RPM for any given vehicle speed if desired. This allows for transmission ratios to be optimized for performance and or towing and using the PTU/rear axle ratio to decrease overall powertrain ratio.

It should be contemplated that when the shifting mechanism moves the range selection assembly 180 into the first speed position, sleeve splines connect the annulus gear directly to the planetary carrier which locks the planets with the sun gear/input shaft 118 and provide direct torque from the input shaft 118 to the differential 182. This generates the 1:1 drive ratio or "high" speed arrangement. The range selection assembly 180 may also be shifted into the neutral speed position (see FIG. 9) where the range selection assembly/annulus gear 180 rotationally disengages the differential 182 from the input shaft 118. Finally, the range selection assembly 180 may be moved into the "low" speed arrangement in the second speed position (see FIG. 8). Here, the range selection assembly 180 engages reduction gear assembly (annulus gear grounded) 192 and the speed of the input shaft 118 is reduced by gearing prior to transfer to the differential 182 and after torque is transmitted to the output shaft 120 when the mode selection assembly 160 is engaged.

Figure 7:
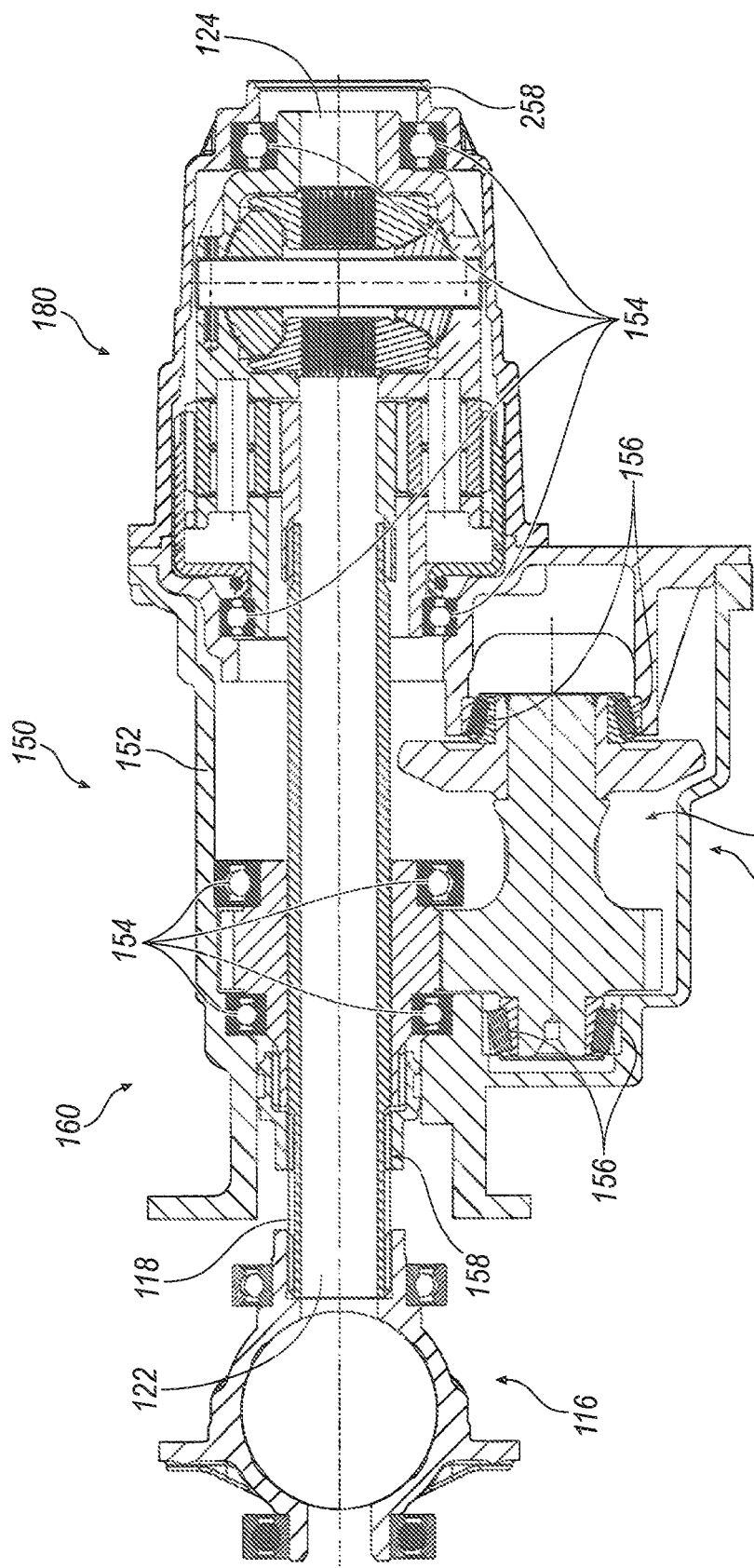
FIG. 7 is a cross sectional view illustrating the power transfer unit illustrated in FIG. 4, the power transfer unit is engaged in an all-wheel drive first speed position.
Figure 8:
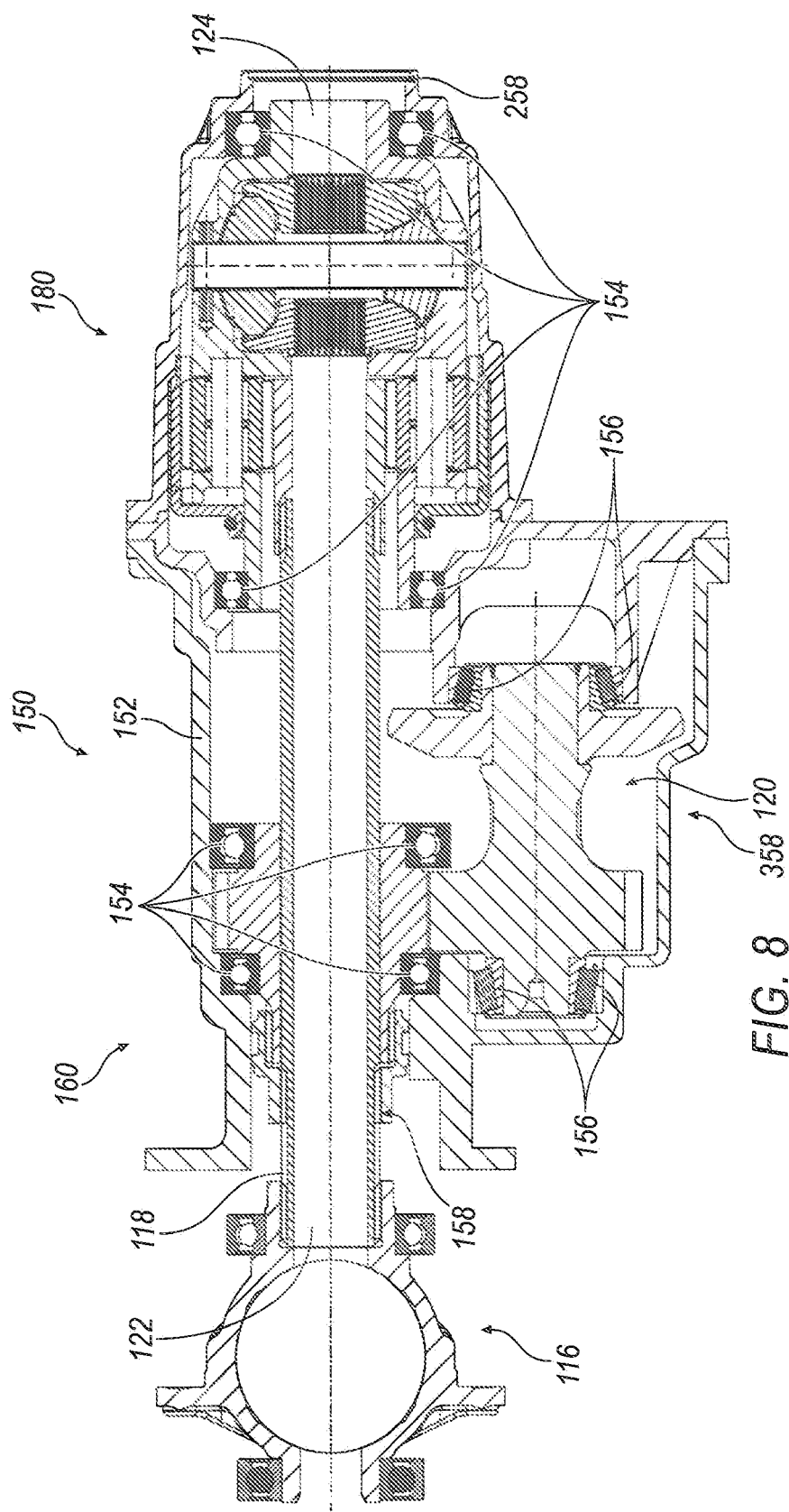
FIG. 8 is a cross sectional view illustrating the power transfer unit illustrated in FIG. 4, the power transfer unit is engaged in a all-wheel drive second speed position.
Figure 9:
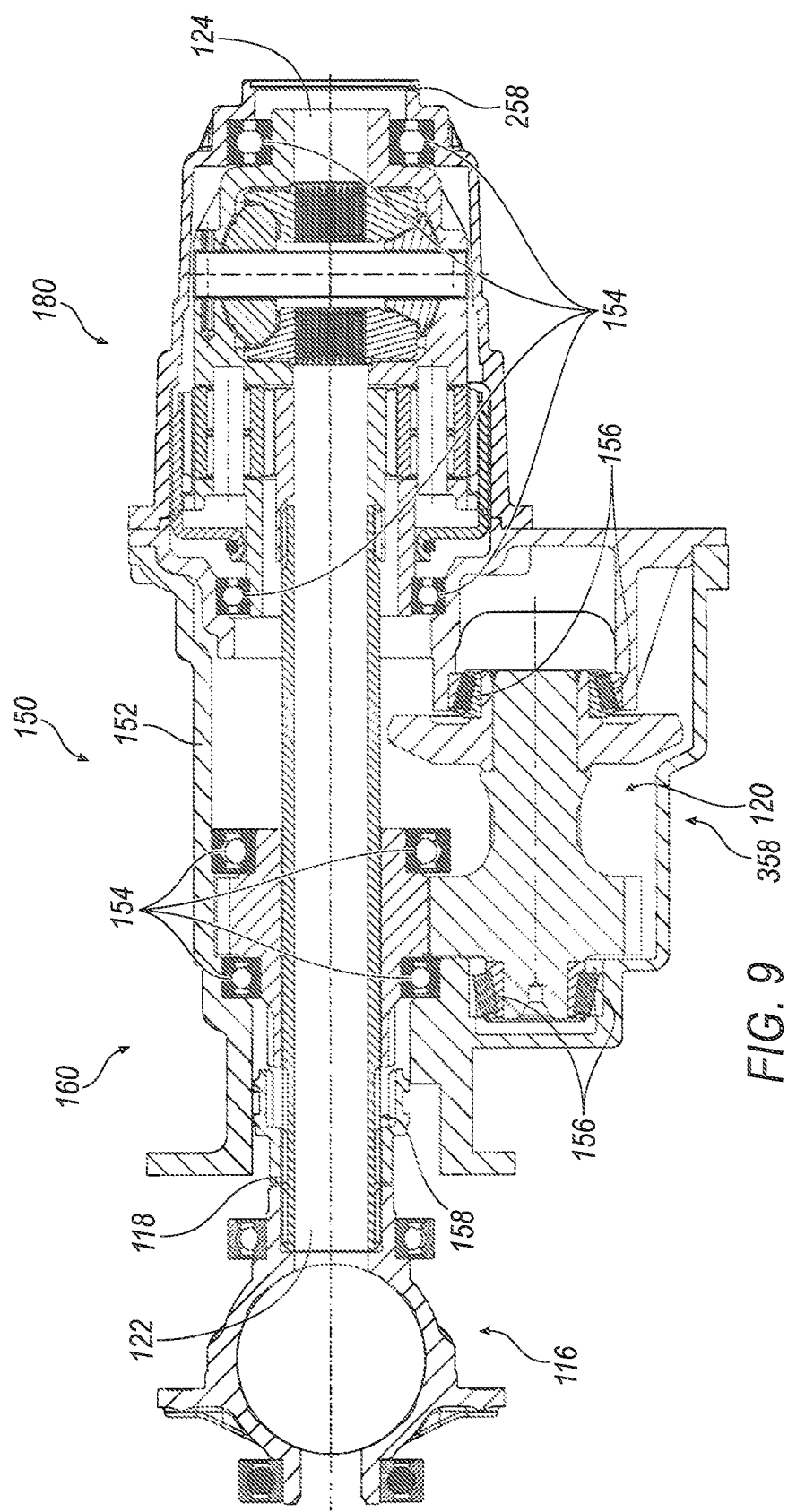
FIG. 9 is a cross sectional view illustrating the power transfer unit illustrated in FIG. 4, the power transfer unit is engaged in a two-wheel drive neutral speed position.
Figure 10:
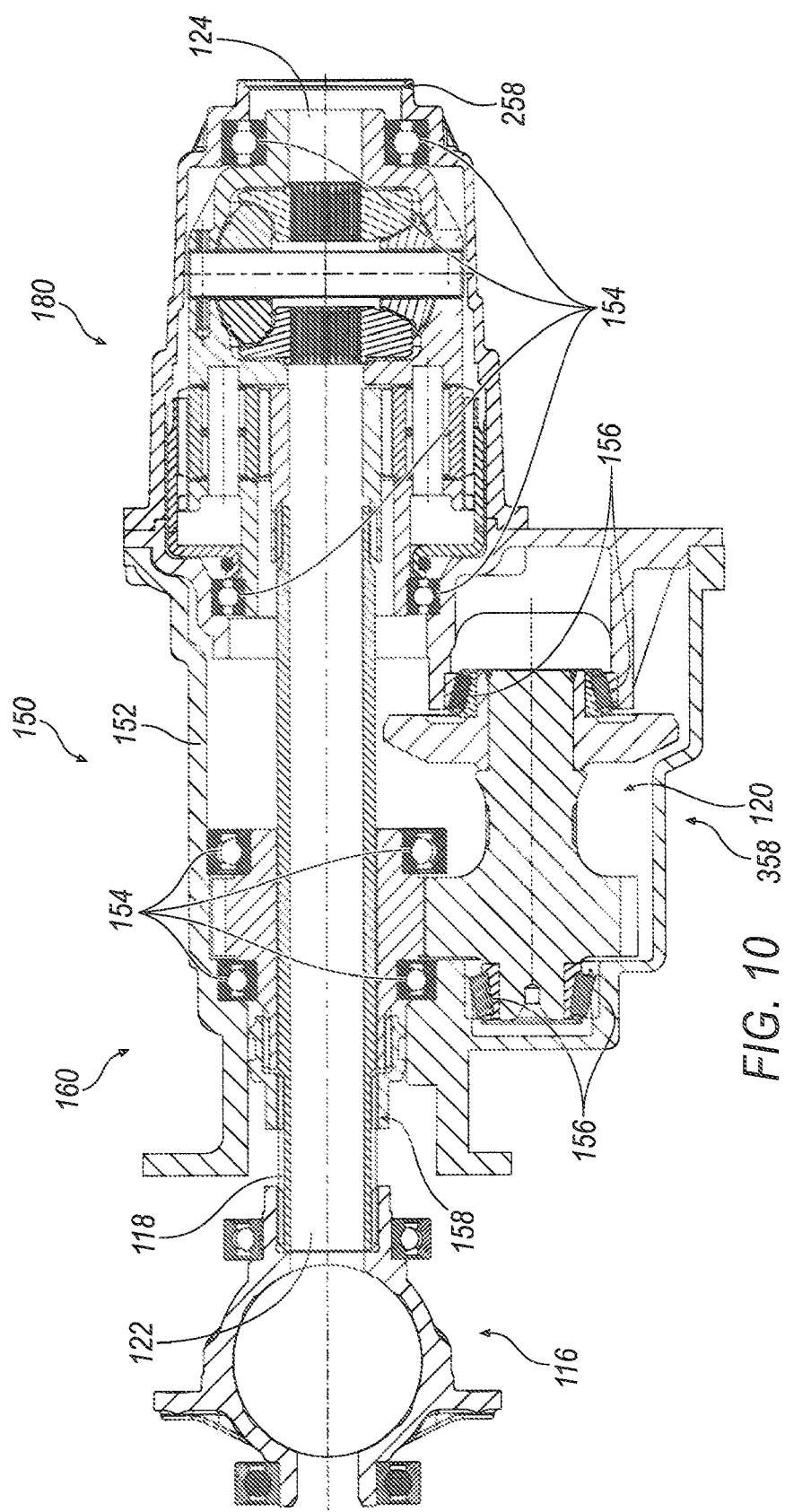
FIG. 10 is a cross sectional view illustrating the power transfer unit illustrated in FIG. 4, the power transfer unit is engaged in a four-wheel drive or all-wheel drive first speed position.

The power transfer unit 150 arrangement disclosed herein may also be used in the all-wheel or four-wheel-drive modes as discussed above regarding the mode selection assembly 160 and specifically depicted in FIGS. 7, 8 and 10. For example, in this arrangement, the power transfer unit 100 is interconnected to the power transfer final drive unit assembly 250, separately illustrated in FIGS. 11-12. As illustrated, the power transfer final drive unit assembly 250 receives power from the front power transfer unit assembly 150 through the torque transferred from the output shaft 120, down the propshaft 130 to an input shaft 218 and ultimately to the rear wheels for the all-wheel drive/four-wheel drive applications. In this configuration, as illustrated in FIG. 1, the final drive unit 250 is mounted between the vehicle's rear wheels and includes output shafts 126, 128 to transmit the torque from the final drive unit 250 to the wheels.

The final drive unit 250, may include a mode selection assembly 260 and a range selection assembly 280. These assemblies 260, 280 are similar to and generally interchangeable with the assemblies 160, 180 discussed above regarding the front power transfer unit 150. However, other variations of assemblies 160, 180, 260, 280 may be contemplated depending on size and application requirements. In the exemplary arrangement illustrated in FIGS. 11-12, the final drive unit 250 includes a single-stage mode selection assembly 260 and the range selection assembly 280. Specifically, the mode selection assembly 260 is illustrated having a single hypoid gear assembly 262 interconnected to the input shaft 218 and a hollow shaft 220. The hollow shaft 220 is used to selectively transmit torque to the mode selection assembly 260 at a first end 222 and to the range selection assembly 280 at a second end 224. The hollow shaft 220 may be splined at each end 222, 224 for transmitting torque to the first rear output shaft 126 and the second rear output shaft 128 by connecting to the planetary diff case assembly 300.

Figure 11:
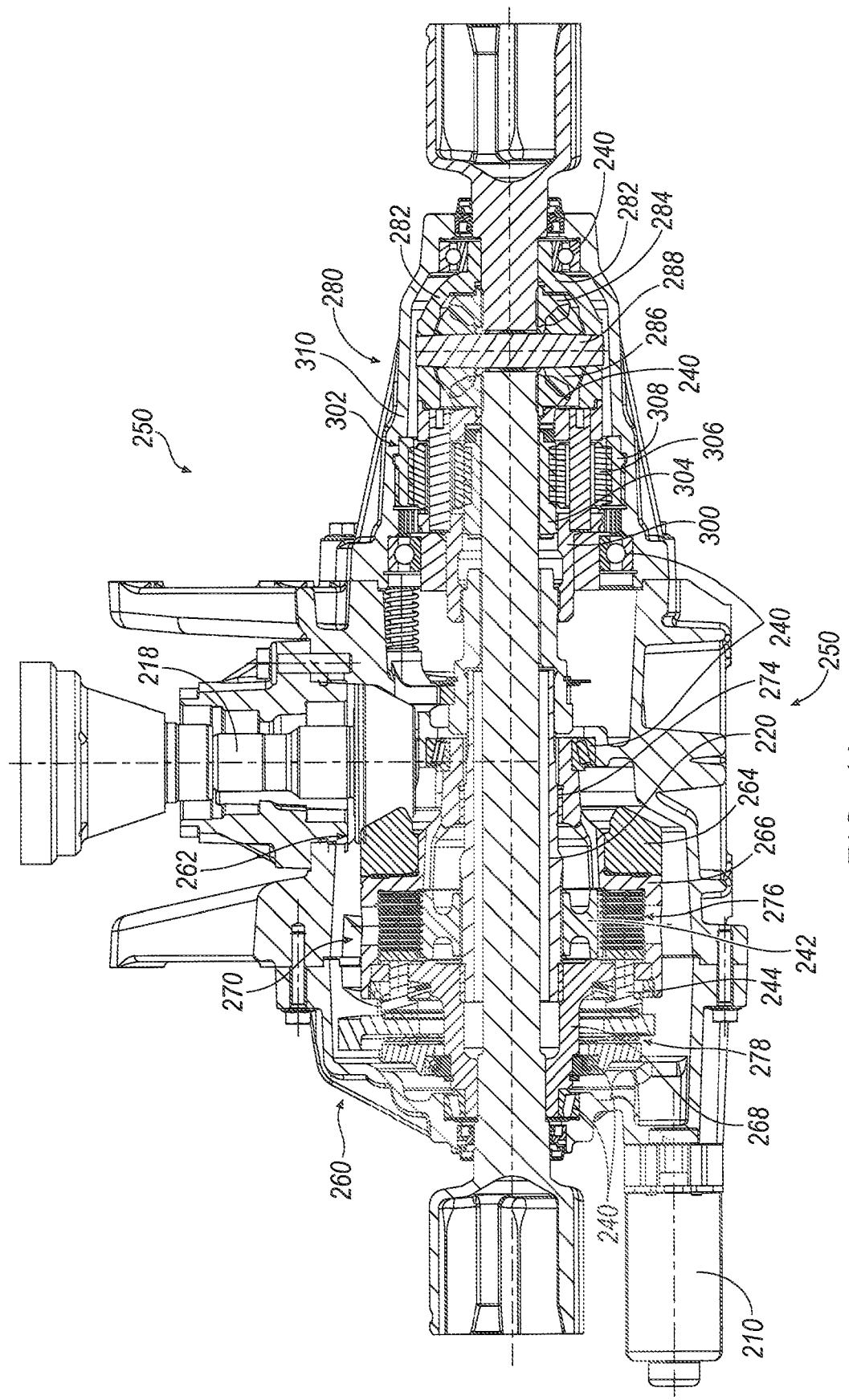
FIG. 11 is a cross sectional view illustrating the mode selection assembly and the range selection assembly of an exemplary power transfer final drive unit.
Figure 12:
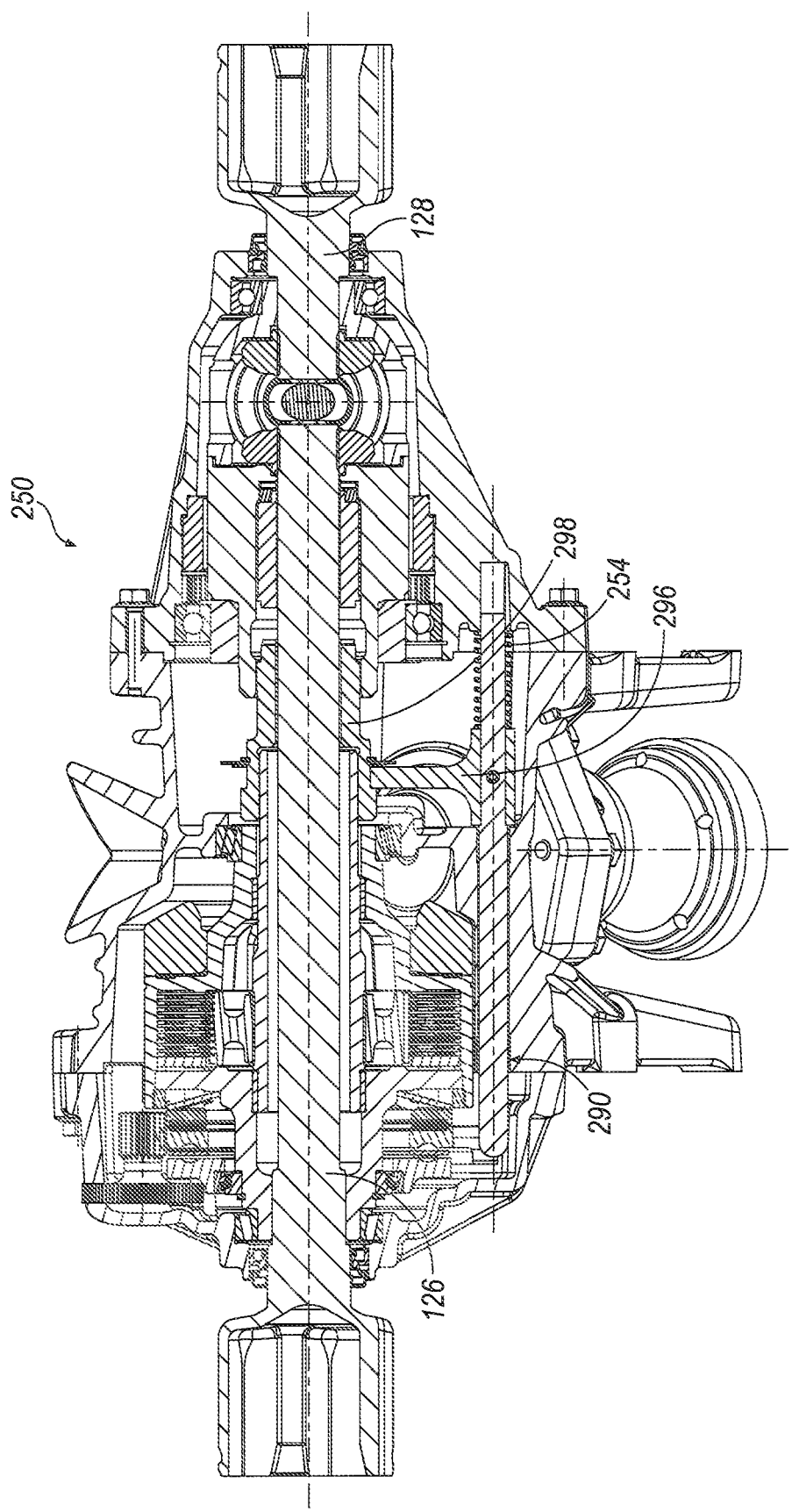
FIG. 12 is an additional cross sectional view illustrating the power transfer final drive unit illustrated in FIG. 11.

As illustrated in FIGS. 11 and 12, the hypoid gear assembly 262 is supported within the final drive unit 250 through a series of bearings 240. The hypoid gear assembly 262 may include a ring gear 264 attached to a housing 266. The ring gear 264 may be selectively attached to the hollow shaft 220 through the housing 266. However, it is contemplated that the ring gear 264 may rotate freely from the hollow shaft 220 and engages the hollow shaft 220 through an engagement mechanism 270 for selectively transmitting torque through the hollow shaft 220 to the first and second rear shafts 126, 128. Specifically, the engagement mechanism 270 may include a set of friction plates 276 that are supported by a plate carrier 242 that may be directly engaged with the hollow shaft 220 and positioned between the housing 266 and an actuator 278 for directly transmitting the torque from the ring gear 264 to the hollow shaft 220.

The mode selection may be achieved by compressing the friction plates 276 between the engagement mechanism 270 and the housing 266 through actuation of an electronic motor 210 which rotates a reduction gear that drives/rotates an axial displacement ball ramp that is in communication with the actuator 278 to cause axial compression of the friction plates 276. Once the friction plates 276 are compressed, torque is transmitted through the plate carrier 242 and to the hollow shaft 220. It should be known that activation of the electronic motor 210 may be made through a series of computer controlled drive train commands (algorithm) through a drive train module (not shown). The module may provide instructions on when to actuate the motor 210 based on certain predetermined parameters, such as, but not limited to sensor inputs for wheel slippage, engine speed, propshaft rotation and engine RPM.

Once the hollow shaft 220 rotates within the final drive unit 250, the range selection assembly 280 may be selectively engaged. As illustrated in FIGS. 11 and 12, the final drive unit's 250 range selection assembly 280 may include a similar layout as previously discussed regarding the front range selection assembly 180. The range selection gear assembly 280 may selectively engage the hollow shaft 220 to transfer torque, at different speeds, from the input shaft 218 to the first and second rear side shafts 126, 128. The rear side shafts 126, 128 meet in the range selection assembly 280 differential 282. In one embodiment, it is contemplated that the differential mechanism 282 is comprised of side gears 284 mounted to the side shafts 126, 128 and pinion gears 286 meshed thereto. The pinion gears 286 are held within the differential 282 by way of a pinion shaft 288.

Like the mode selection assembly 260, the range selection assembly 280 may selectively engage the hollow shaft 220 for transferring torque. The range selection assembly 280 may be selectively engaged between a first speed position and a second speed position. Although it is contemplated that the range selection assembly 180 may be controlled in a variety of fashions including, but not limited to, electronically or manually, in one embodiment it is contemplated that the range selection assembly 280 may be controlled via a shift mechanism 290 that includes at least a slide bushing, a return spring 254 and a shift fork 296 that is in communication with a shift sleeve 298. The shift mechanism 290 selectively engages the shift sleeve 298 with the hollow shaft's second end 224 to transmit torque to a driving collar 300 selectively engaged with at least one of a coupling 304 and the differential 282 to move the range selection assembly 280 between the two speed positions, as well as a neutral position.

Additionally, it should be contemplated that in applications where improved rotating assembly efficiency and fuel efficiency is needed or required, then the shift sleeve 298 and the driving collar 300 will be eliminated and the hollow shaft 220 is solely used. When the hollow shaft 220 is solely used, a series of helical gears or engagement knobs (not shown) may be employed, and the shifting mechanism 290 may be used to slide the hollow shaft 220 into selective engagement with the mode selection assembly 260 and the range selection assembly 280 similar to the selective engagement previously discussed.

In the first speed position, the torque from the hollow shaft 220 is transferred directly to the differential 282 to result in a 1:1 drive ratio. However, by moving the range selection assembly 280 to the second speed position the torque from the hollow shaft 220 is transferred through a speed reduction assembly 302. Although a variety of range selection assemblies 280 are contemplated, one exemplary arrangement contemplates the use of a reduction gear assembly 302. In still another refinement, it is contemplated that the reduction gear assembly 302 may be comprised of a coupling or sun gear 304 positioned around and sharing an axis with the side shaft 126. The sun gear 304 may be engaged with a plurality of planetary gears 306 positioned around the sun gear 304 and engaging an annulus gear 308. It should be understood that the annulus gear 308 may either be fixed to a housing 310 or selectively engaged to the housing 310, as previously discussed regarding the range selection assembly 180. The gear ratios provided in the power transfer final drive unit 250 may be the same as indicated for the front power transfer unit 150 and the precise drive ratio may be selectively modified through gearing to achieve a wide range of drive ratios. This allows the vehicle drive train 100 to have a "low" drive feature for off-road creeping and a "high" drive feature for roadways and improved gas mileage.

It should be contemplated that when the shifting mechanism 290 moves the range selection assembly 280 into the first speed position, the shift sleeve 298 engages the hollow shaft 220 and the driving collar 300 to provide direct torque from the hypoid ring gear 264 to the differential 282. This generates the 1:1 drive ratio or "high" speed arrangement. The range selection assembly 280 may also be shifted into the neutral speed position where the range selection assembly 280 disengages the differential 282 from the driving collar 300 and the hollow shaft 220. Finally, the range selection assembly 280 may be moved into the "low" speed arrangement in the second speed position.

It should also be contemplated that at least the high range selection may be selectively engaged or disengaged at anytime during operation of any of the previously discussed mode selections. Specifically, when the drive train is being operated at highway speeds, the rear wheels and the associated shafts 126, 128 will be spinning. An operator requests a mode shift through the computer controlled module, which sends a signal to the electronic motor 210 to activate and engage the engagement mechanism 270, basically, providing a reverse engagement, causing the hypoid gear assembly 262 to rotate at an initially reduced rate as compared to the wheel speed. This reduced rate is a result in an RPM delta across the friction plates 276. The reduced rate of rotation in the hypoid gear assembly 262 helps to synchronize the activation of the mode selection in the front power transfer unit 150. Thus, the final drive unit 250 transfers torque to the front power transfer unit 150 during synchronization, and then the front power transfer unit 150 transfers torque to the final drive unit 250 during a traction request event. Once the mode selection has been established (shift collar engaged) typical AWD/four wheel drive electronic traction logic can be enabled. During this mode the rear actuation 260 is actively controlled to provide torque to the secondary axle when required based on AWD control logic.

Additionally, it should be contemplated that the housings 152, 310 may be made of multiple housing sections secured together and sealed to create a single housing 152, 310. The housings may include at least one fluid sump reservoir for containing lubricating fluids. In some applications two or more sumps may be employed to segregate the internal areas of the housings 152, 310 where a lubricant is not required. This may help to reduce the weight of the units 150, 250 by minimizing the amount of fluid required to fill each sump. The housings 152, 310 may also include a plurality of seals 158, 258, 358 inserted about any orifice or aperture extending through the housing 152, 310. The seals 158, 258, 358 help to provide and maintain a closed lubrication system that is separate from the transmission 114 or outside environment. Specifically, as illustrated in regard to the front power transfer unit, the first seal 158 may be positioned about at least one of the input shaft 118 and the first front shaft 122 to prevent transmission fluid (not shown) from entering the power transfer unit 150. A second seal 258 may be positioned about the second front shaft 124, while a third seal 358 may be positioned about the output shaft 120. The seals 158, 258, 358 may prevent a lubricant from leaking from the power transfer unit 150, 250 and from exposure to any exterior element. The seals 158, 258, 358 may include a rigid contacting surface that is interference fit into a channel or groove in the housing 152, 252 and a flexible contacting surface adjacent the rotating member or shaft 118, 120, 122, 124. The rigid portion may be constructed from any known rigid material used in sealing products, such as, but not limited to steel, aluminum, brass and composite, while the flexible portion may be constructed from any known sealing material, such as, but not limited to rubber, plastic, composite or other suitable materials.

It should be understood that although the power transfer unit 150 has been largely illustrated in a single embodiment of the two-stage gear assembly, it should be understood that the present disclosure is intended to be applicable to a wide variety of power transfer units including, but not limited to, single-stage power transfer unit gear assemblies and multi-stage (current state of the art are single, 2 stage and three-stage) power transfer unit gear assemblies. Merely by way of example, where a single-stage assembly is used, the helical gear set 162 is eliminated and the use of a single hypoid gear set 166 is utilized. Additionally, when the single-stage is contemplated, the gear set 168 may be engaged or disengaged similar the two-stage assembly, described above. Specifically, the engagement element 170 may be either fixed or axially movable and the input shaft 118 may be axially fixed or axially movable for selective engagement of the mode selection assembly 160. In addition, although selective engagement is described as being between the input shaft 118 and the helical gear set 164 or the planetary gear set 190, it is contemplated that the term "input shaft" may be interpreted to comprise any torque input shaft within the power transfer unit 150. As such, they may include traditional input shafts, idler shafts, intermediate shafts, pinion output shafts etc.

Further, it should be understood that although the power transfer final drive unit 250 has been largely illustrated in a single embodiment of the single-stage gear assembly, it should be understood that the present disclosure is intended to be applicable to a wide variety of power transfer final drive units including, but not limited to, multi-stage (two-stage and three-stage) power transfer final drive unit gear assemblies. Merely by way of example, where a two-stage assembly is used, the unit would be similar to the power transfer unit 150, disclosed above having a helical gear set 162 used in combination with a hypoid gear set 166. In addition, although selective engagement is described as being between the hollow shaft 220 and the mode selection assembly 260 and the range selection assembly 280, it is contemplated that the term "input shaft" may be interpreted to comprise any torque input shaft within the power transfer unit 250. As such, they may include traditional input shafts, idler shafts, intermediate shafts, pinion output shafts etc.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A power transfer unit assembly for a vehicle, comprising:
    a housing;
    an internal variable speed differential positioned within the housing;
    a first front side shaft rotatively connected to the internal variable speed differential;
    a second front side shaft rotatively connected to the internal variable speed differential;
    an input shaft interconnected to at least one of the first or second side shafts; and
    at least one shifting mechanism for engaging at least one of the first or second shafts with at least one mode selection gear set;
    wherein the engagement of the mode selection gear set transfers torque from the input shaft to selectively engage with a second gear set interconnected to a power transfer final drive unit assembly having an internal variable speed differential, wherein said input shaft is slidable for selective engagement of at least one of said variable speed differential or said mode selection assembly.

2. The power transfer unit assembly according to claim 1, wherein the internal variable speed differential is a range selection assembly, and wherein the range selection assembly directly engages the differential to transmit torque at a low and a high ratio in the range of approximately 1:1 to approximately 4:3.

3. The power transfer unit assembly according to claim 2, wherein said range selection assembly further comprises: a sun gear mounted around said input shaft; and a plurality of planetary gears mounted between said sun gear and an annulus gear in the power transfer unit housing, wherein said annulus gear is slidable or fixed.

4. The power transfer unit assembly according to claim 1, wherein said power transfer unit is adjustable to at least one of a two-wheel drive high position, a two-wheel drive low position, an all-wheel drive position, a four-wheel drive position and a neutral speed position.

5. The power transfer unit assembly according to claim 1, wherein at least one of said power transfer unit assembly or said power transfer final drive unit assembly includes at least one of an engagement sleeve or an engagement collar.

6. The power transfer unit assembly according to claim 1, wherein at least one of said power transfer unit assembly or said power transfer final drive unit assembly includes said sliding input shaft, wherein the sliding input shaft selectively engages at least one of said mode selection gear set or said internal variable speed differential.

7. The power transfer unit assembly according to claim 1, further comprising: an electronic actuation mechanism, wherein said electronic actuation mechanism selectively engages at least one of the power transfer unit assembly or the power transfer final drive unit assembly, wherein torque is transmitted from at least one of the power transfer unit assembly or the power transfer final drive unit assembly when the electronic actuation mechanism is engaged.

8. The power transfer unit assembly according to claim 1, wherein the power transfer final drive unit assembly further comprises at least one gear assembly.

9. The power transfer unit assembly according to claim 1, the power transfer final drive unit assembly further comprises:
    a hypoid gear assembly engaged to said input shaft;
    an engagement mechanism, wherein said engagement mechanism includes an actuation device and a plurality of friction plates, said plates configured to at least one of transmit torque from said hypoid gear assembly to a variable speed differential or transmit torque from said internal variable speed differential to said hypoid gear assembly; and wherein the internal variable speed differential includes a sun gear mounted around a planetary input shaft; and a plurality of planetary gears mounted between said sun gear and an annulus gear in the power transfer unit housing, wherein said annulus gear is slidable or fixed.

10. A vehicle drive train assembly, comprising:
a first side shaft;
a second side shaft;
a power transfer unit having an input shaft surrounding a portion of said first side shaft;
a mode selection gear assembly positioned within said power transfer unit and selectively engaged with said input shaft;
a differential housing a differential mechanism positioned within said power transfer unit, said differential mechanism engaging said first side shaft and said second side shaft;
at least one engagement mechanism, said engagement mechanism selectively engages at least one of a first speed position, a second speed position, a neutral position and a mode;
a range reduction gear assembly mounted adjacent said differential, wherein said engagement mechanism selectively engages said differential when in at least one of said first speed position and said second speed position; and
a power transfer final drive unit interconnected to an output shaft of said power transfer unit, wherein said power transfer final drive unit includes a mode selection assembly, a differential and a reduction gear assembly, wherein the differential and the reduction gear assembly provides at least a first speed position and a second speed position, wherein the mode selection gear assembly is positioned between a transmission output shaft and the range reduction gear assembly to provide rear torque transfer via the mode selection gear assembly prior to range selection via the range reduction gear assembly.

11. The vehicle drive train assembly according to claim 10, wherein said mode is at least one of a two-wheel drive, an all-wheel drive or a four-wheel drive mode.

12. The vehicle drive train assembly according to claim 10, said power transfer final drive unit further comprising: a shift fork engaged to at least one of a hollow input shaft or an engagement mechanism, said hollow input shaft is selectively engaged with said mode selection gear assembly and at least one of the differential or the range reduction gear assembly.

13. The vehicle drive train assembly according to claim 10, said power transfer unit further comprising: a shift fork interconnected with a shifting mechanism in at least one of said range reduction gear assembly and said mode selection gear assembly, said shift fork controlling engagement of at least one mode and at least one speed.

14. The vehicle drive train assembly according to claim 13, wherein said shifting mechanism comprises a sleeve spline.

15. The vehicle drive train assembly according to claim 10, wherein said first speed is a 1:1 ratio and said second speed is lower.

16. The vehicle drive train assembly according to claim 10, wherein said range reduction gear assembly comprises: a sun gear mounted around said shaft; and a plurality of planetary gears mounted between said sun gear and said differential, said shifting mechanism engaging said sun gear when in said second speed position.

17. A method of controlling speed of a vehicle drive train comprising:
transmitting torque from a power source;
inputting torque to an input shaft;
engaging a mode selection gear assembly;
engaging a range selection gear assembly;
transmitting torque to an output;
moving a speed selection assembly to at least a first speed position, a second speed position, or a neutral position, wherein said speed selection assembly directly engages said differential to achieve at least a first ratio or a second ratio; and
transmitting torque from the output to a power transfer final drive unit, wherein the mode selection gear assembly is positioned between a transmission output shaft and the range selection gear assembly to provide rear torque transfer via the mode selection gear assembly prior to range selection via the range selection gear assembly.

18. The method as described in claim 17, further comprising:
engaging a mode selection assembly in the power transfer final drive unit;
transferring torque from said mode selection assembly to a range selection assembly; and
transferring torque from said range selection assembly to at least one rear output shaft.

19. The method as describe in claim 17, further comprising:
transferring torque from at least one wheel and interconnected output shaft to a range selection assembly in the power transfer final drive unit;
transferring torque from the range selection assembly in the power transfer final drive unit to a mode selection assembly in the power transfer final drive unit;
engaging an input gear in the power transfer final drive unit;
transferring torque from said input gear to a propeller shaft; and
synchronizing said power transfer unit.

* * * * *